(12) United States Patent
Lin et al.

(10) Patent No.: US 12,039,122 B2
(45) Date of Patent: Jul. 16, 2024

(54) TOUCH APPARATUS

(71) Applicant: Novatek Microelectronics Corp., Hsinchu (TW)

(72) Inventors: Yi-Ying Lin, Hualien County (TW); Chih-Chang Lai, Taichung (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 17/732,363

(22) Filed: Apr. 28, 2022

(65) Prior Publication Data
US 2022/0350438 A1 Nov. 3, 2022

Related U.S. Application Data

(60) Provisional application No. 63/183,062, filed on May 3, 2021.

(51) Int. Cl.
*G06F 3/041* (2006.01)
(52) U.S. Cl.
CPC .................. *G06F 3/0416* (2013.01)
(58) Field of Classification Search
None
See application file for complete search history.

(56) References Cited

U.S. PATENT DOCUMENTS

| | | | |
|---|---|---|---|
| 10,599,275 B2 | 3/2020 | He et al. | |
| 10,705,632 B2* | 7/2020 | Wei | G06F 3/041 |
| 10,908,754 B2 | 2/2021 | Bang et al. | |
| 11,036,390 B2 | 6/2021 | Chen et al. | |
| 11,144,198 B2 | 10/2021 | Chen et al. | |
| 11,275,476 B2 | 3/2022 | Bang et al. | |
| 2007/0152983 A1* | 7/2007 | McKillop | G06F 3/04886 345/173 |
| 2007/0242057 A1* | 10/2007 | Zadesky | G06F 3/03547 345/173 |

(Continued)

FOREIGN PATENT DOCUMENTS

| TW | I579753 | 4/2017 |
|---|---|---|
| TW | I588730 | 6/2017 |

(Continued)

OTHER PUBLICATIONS

"Office Action of Taiwan Counterpart Application", issued on Jan. 31, 2023, p. 1-p. 6.

*Primary Examiner* — Ryan A Lubit
(74) *Attorney, Agent, or Firm* — JCIPRNET

(57) ABSTRACT

A touch apparatus includes a touch screen and a touch controller. The touch controller is configured to process touch sensing signals received from the touch screen to generate a touch coordinate with respect to a touch event occurring on the touch screen. The touch screen includes a plurality of first touch sensing electrodes and a plurality of second touch sensing electrodes. The first touch sensing electrodes are disposed in a center area of the touch screen, wherein at least one part of the first touch sensing electrodes are rectangular. The second touch sensing electrodes are disposed in an edge area of the touch screen surrounding the center area, wherein each of the second touch sensing electrodes is corresponding to a central angle and a plurality of central angles corresponding to the plurality of second touch sensing electrodes substantially equal.

3 Claims, 6 Drawing Sheets

(56) References Cited

U.S. PATENT DOCUMENTS

| | | | |
|---|---|---|---|
| 2008/0084397 A1* | 4/2008 | On | G06F 3/0481 |
| | | | 345/173 |
| 2015/0212627 A1* | 7/2015 | Hotelling | G06F 3/0445 |
| | | | 345/174 |
| 2016/0246423 A1* | 8/2016 | Fu | G06F 3/0446 |
| 2016/0291710 A1* | 10/2016 | Kang | G06F 3/0487 |
| 2019/0064967 A1 | 2/2019 | He et al. | |
| 2019/0361074 A1 | 11/2019 | Chen et al. | |
| 2019/0361603 A1 | 11/2019 | Chen et al. | |
| 2020/0012371 A1* | 1/2020 | Yang | H10K 59/40 |
| 2020/0089369 A1 | 3/2020 | Bang et al. | |
| 2021/0232267 A1 | 7/2021 | Bang et al. | |
| 2021/0318779 A1* | 10/2021 | Ko | G06F 3/0448 |
| 2021/0382601 A1* | 12/2021 | Yang | G06F 3/04184 |
| 2022/0137727 A1* | 5/2022 | Kono | G06F 3/0448 |
| | | | 345/174 |
| 2022/0214770 A1 | 7/2022 | Bang et al. | |
| 2022/0229515 A1* | 7/2022 | Fujisawa | G06F 3/0412 |
| 2022/0236835 A1* | 7/2022 | Ito | G06F 3/0448 |

FOREIGN PATENT DOCUMENTS

| | | |
|---|---|---|
| TW | I623870 | 5/2018 |
| TW | 202013032 | 4/2020 |
| TW | I702408 | 8/2020 |
| TW | M606406 | 1/2021 |
| TW | 202105144 | 2/2021 |
| TW | I779225 | 10/2022 |

\* cited by examiner

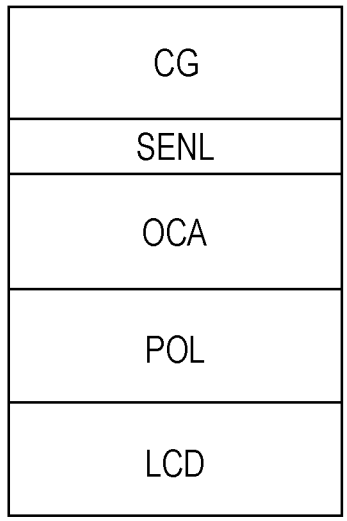 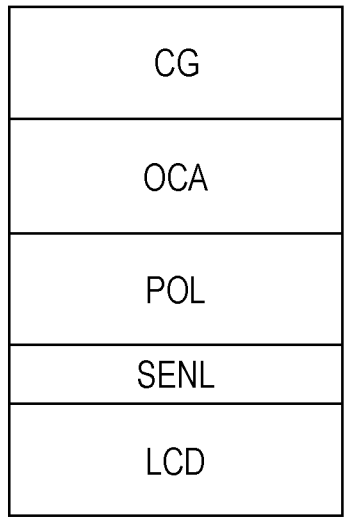 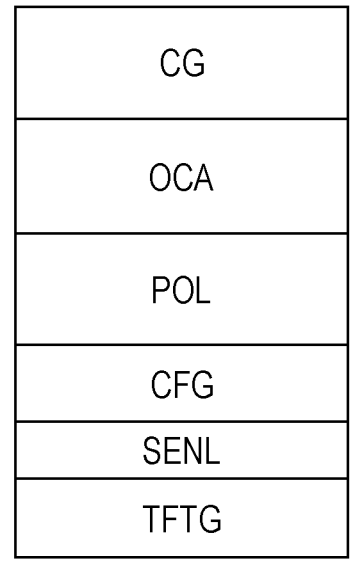
FIG. 6A   FIG. 6B   FIG. 6C
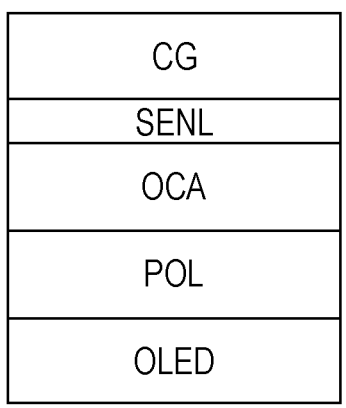 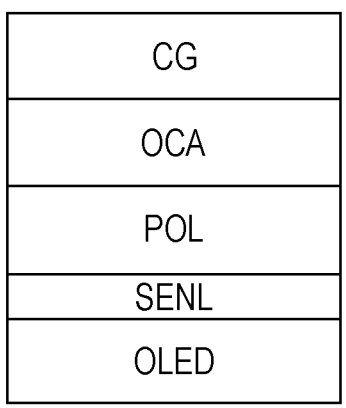 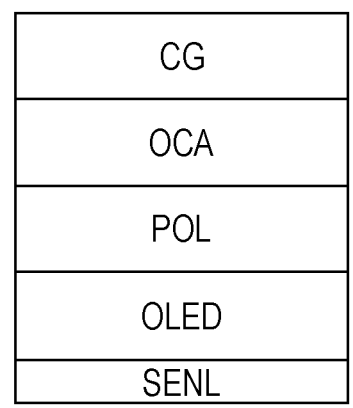
FIG. 7A   FIG. 7B   FIG. 7C

TOUCH APPARATUS

CROSS-REFERENCE TO RELATED APPLICATION

This application claims the priority benefit of U.S. Provisional Application No. 63/183,062, filed on May 3, 2021. The entirety of the above-mentioned patent application is hereby incorporated by reference herein and made a part of this specification.

BACKGROUND

Field of the Invention

The invention relates to a touch apparatus and more particularly, to a touch apparatus which can improve edge angle resolution and sensing uniformity for touch detection operation.

Description of Related Art

In the circular surface of a hand-held display device, such as a smart watch, a touch screen is traditionally designed by dividing it into a plurality of sensor electrodes along a horizontal axis and a vertical axis. By this manner, shape and size of each sensor electrodes disposed in an edge area may be limited by a shape of the of the touch screen. Such as that, a uniformity of the sensor electrodes in the edge area of the touch screen is reduced. Since the smart watch needs to support a touching action sliding on an edge area of the touch screen, the low uniformity of the sensor electrodes in the edge area will decrease a reliability of touch sensing data calculated by the touch apparatus, and also limits number of touch points that can be recognized under a unit sliding arc of the touching action.

SUMMARY

The invention provides a touch apparatus for increasing edge angle resolution and sensing uniformity for touch detection operation.

According to an embodiment of the invention, the touch apparatus includes a touch screen and a touch controller. The touch controller is configured to process touch sensing signals received from the touch screen to generate a touch coordinate with respect to a touch event occurring on the touch screen. The touch screen includes a plurality of first touch sensing electrodes and a plurality of second touch sensing electrodes. The first touch sensing electrodes are disposed in a center area of the touch screen, wherein at least one part of the first touch sensing electrodes are rectangular. The second touch sensing electrodes are disposed in an edge area of the touch screen surrounding the center area, wherein each of the second touch sensing electrodes is corresponding to a central angle and a plurality of central angles corresponding to the plurality of second touch sensing electrodes substantially equal.

To sum up, by setting the second touch sensing electrodes disposed in the edge area of the display screen have central angles, the touch apparatus can improve a uniformity of touch sensing electrodes in the edge area. Such as that, a touch sensing coordinate can be accuracy calculated to improve an experience of touching controlling action by a user.

To make the above features and advantages of the invention more comprehensible, embodiments accompanied with drawings are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 6A to FIG. 6C illustrate a schematic plot of a cross section of a touch display screen integrated by a touch screen and a display screen according to embodiments of present disclosure.

FIG. 7A to FIG. 7C illustrate a schematic plot of a cross section of a touch display screen integrated by a touch screen and a display screen according to other embodiments of present disclosure.

DESCRIPTION OF EMBODIMENTS

Figure 1:
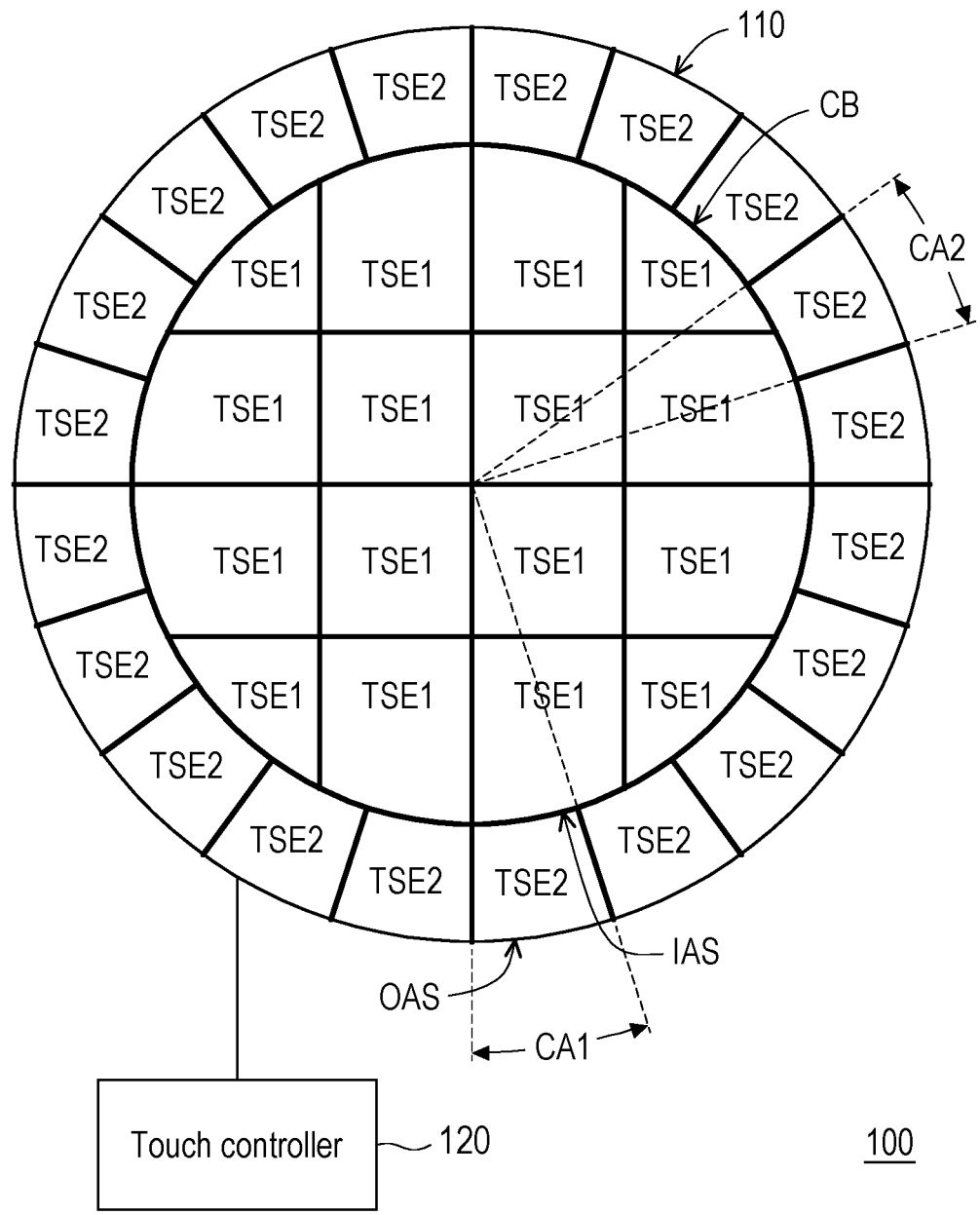
FIG. 1 illustrates a schematic diagram of a touch apparatus according to an embodiment of present disclosure.

The term "couple (or connect)" throughout the specification (including the claims) of this application are used broadly and encompass direct and indirect connection or coupling means. For instance, if the disclosure describes a first apparatus being coupled (or connected) to a second apparatus, then it should be interpreted that the first apparatus can be directly connected to the second apparatus, or the first apparatus can be indirectly connected to the second apparatus through other devices or by a certain coupling means. In addition, terms such as "first" and "second" mentioned throughout the specification (including the claims) of this application are only for naming the names of the elements or distinguishing different embodiments or scopes and are not intended to limit the upper limit or the lower limit of the number of the elements not intended to limit sequences of the elements. Moreover, elements/components/steps with same reference numerals represent same or similar parts in the drawings and embodiments. Elements/components/notations with the same reference numerals in different embodiments may be referenced to the related description.

Please refer to FIG. 1, which illustrates a schematic diagram of a touch apparatus according to an embodiment of present disclosure. The touch apparatus 100 includes a touch screen 110 and a touch controller 120. The touch controller 120 is configured to process touch sensing signals received from the touch screen 110 and generates a touch coordinate with respect to a touch event occurring on the touch screen 110. The touch screen 110 includes a plurality of first touch sensing electrodes TSE1 and a plurality of second touch sensing electrodes TSE2. The first touch sensing electrodes TSE1 are disposed in a center area of the touch screen 110, and the second touch sensing electrodes TSE2 are disposed in an edge area of the touch screen 110. In this embodiment, the center area and the edge area of the touch screen 110 can be divided by a ring boundary CB, and the center area is formed inside the ring boundary CB and the edge area is formed outside the ring boundary CB. That is, the center area is surrounded by the edge area. In some embodiment, a center of the ring boundary CB may be a center of the touch screen 110. Shapes of the touch screen 110 and the ring boundary CB may be circle or oval.

In this embodiment, the edge area may be a ring band. The edge area may be evenly divided into a plurality of divided zones, and the second touch sensing electrodes TSE2 may be respectively disposed on the divided zones. In here, areas of the second touch sensing electrodes TSE2 may be same.

On the other hand, at least a part if the first sensing electrodes TSE1 are rectangular, and the other part of the first sensing electrodes TSE1 may be any shape. The second touch sensing electrodes TSE2 respectively correspond to a plurality of central angles (such as central angles CA1 and CA2), and the central angles substantially equal. That is, the central angle CA1 substantially equals the central angle CA2. Of course, there may be a manufacturing error between the central angles CA1 and CA2.

Each of the second touch sensing electrodes TSE2 has an outer arc side OAS corresponding to the central angle CA1, and the outer arc side OAS is disposed on an outer side of the touch screen 110. Each of the second touch sensing electrodes TSE2 also has an inner arc side IAS corresponding to the central angle CA1, and the inner arc side IAS is disposed adjacent to the ring boundary CB.

A size of the center area and a size of the edge area can be adjusted by a designer of the touch apparatus 100 according to real necessary of an application, and no special limitation here. Also, number of the second touch sensing electrode TSE2 can be adjusted by a designer of the touch apparatus 100 according to a touching resolution, and no special limitation here, either.

In response to the touch event, a finger may touch the touch screen and the finger may cover at least one of the first touch sensing electrodes TSE1 and the second touch sensing electrodes TSE2. The touched first touch sensing electrodes TSE1 and/or the touched second touch sensing electrodes TSE2 may response a touch sensing signal to the touch controller 120. The touch controller 120 may calculate a touch coordinate based on a Cartesian coordinate system or a polar coordinate system to determines the most effective touch sensing data according to the touch sensing signal.

In detail, the touch controller 120 may determine to use the Cartesian coordinate system or the polar coordinate system according to a sensing amount of each of the touched touch sensing electrodes. If the sensing amount contributed from the first touch sensing electrodes TSE1 is larger than the sensing amount contributed from the second touch sensing electrodes TSE2, the Cartesian coordinate system can be used, and if the sensing amount contributed from the second touch sensing electrodes TSE2 is larger than the sensing amount contributed from the first touch sensing electrodes TSE1, the polar coordinate system can be used.

Furthermore, if the touch controller 120 calculates the touch coordinate based on the Cartesian coordinate system, the touch coordinate can be represented by a formula (1) show as below, where two touch sensing electrodes are touched:

$$Px = \frac{X1 \times dC1 + X2 \times dC2}{dC1 + dC2}, Py = \frac{Y1 \times dC1 + Y2 \times dC2}{dC1 + dC2} \quad (1)$$

Wherein X1, Y1, X2 and Y2 are coordinates of gravity centers of touched touch sensing electrodes, dC1 and dC2 are sensing amounts of the touched touch sensing electrodes, and (Px, Py) is the touch coordinate.

If the touch controller 120 calculates the touch coordinate based on the polar coordinate system, the touch coordinate can be represented by a formula (2) show as below, where two touch sensing electrodes are touched:

$$P\theta = \frac{\theta 1 \times dC1 + \theta 2 \times dC2}{dC1 + dC2}, Pr = \frac{r1 \times dC1 + r2 \times dC2}{dC1 + dC2} \quad (2)$$

Wherein θ1 and θ2 are gravity angles of touched touch sensing electrodes, dC1 and dC2 are sensing amounts of the touched touch sensing electrodes, and r1 r2 are gravity radiuses of the touched touch sensing electrodes, and (Pθ, Pr) is the touch coordinate. In here, the touch coordinate (Pθ, Pr) can be transfer to a touch coordinate in the Cartesian coordinate system.

The transformation scheme between the Cartesian coordinate system and the polar coordinate system is well-known by a person skilled in this art, and no more description here.

It should be noted here, the controller 120 may be a processor having a computation function. Alternatively, the controller 120 may be a hardware circuit designed by using hardware description language (HDL) or any digital circuit design method well known by related technicians of the field, and implemented through a field programmable gate array (FPGA), a complex programmable logic device (CPLD) or an application-specific integrated circuit (ASIC).

Figure 2:
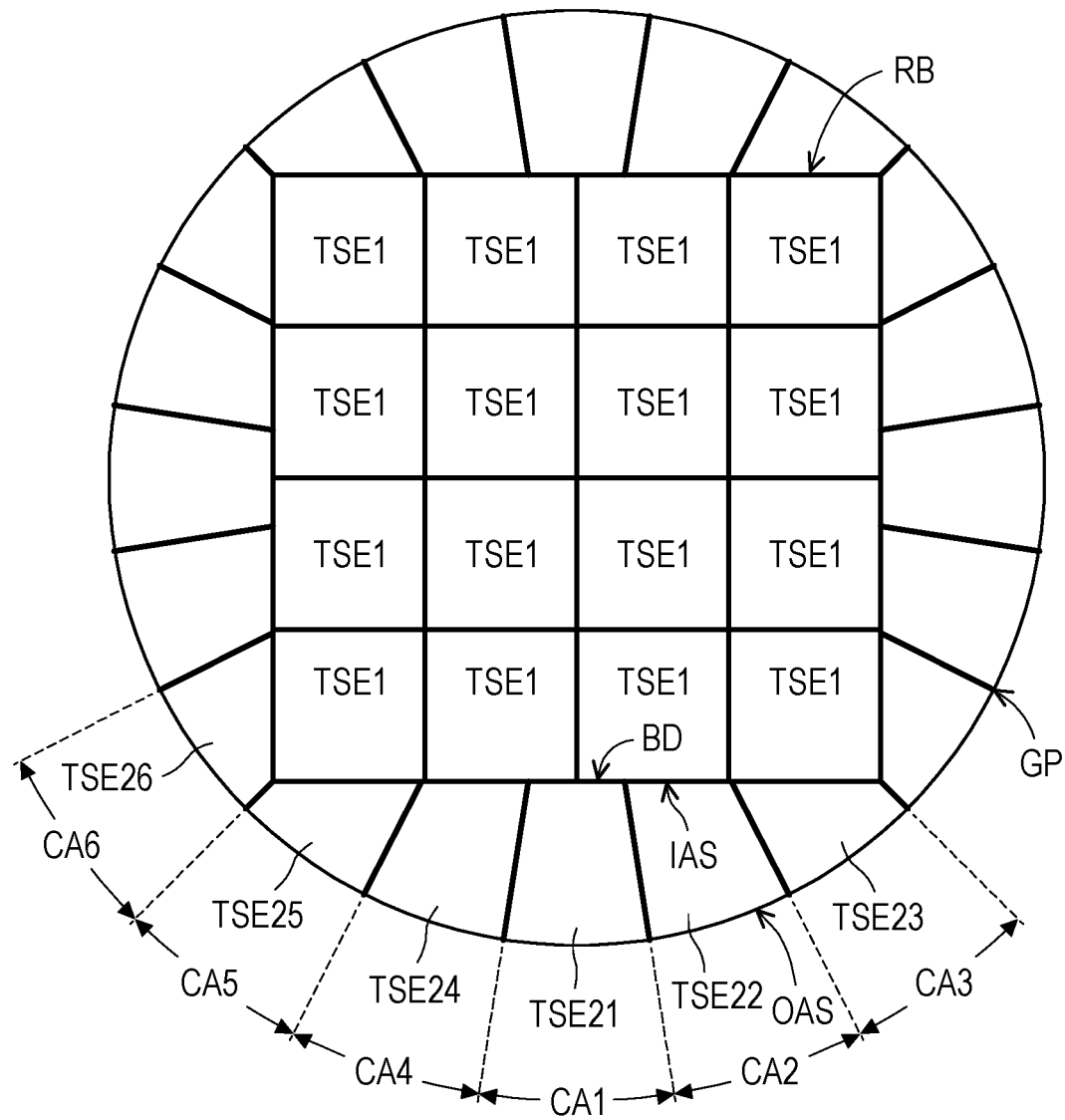
FIG. 2 illustrates a schematic diagram of a touch screen according to another embodiment of present disclosure.

Please refer to FIG. 2, which illustrates a schematic diagram of a touch screen according to another embodiment of present disclosure. The touch screen 200 includes a plurality of first touch sensing electrodes TSE1 and a plurality of second touch sensing electrodes TSE2. In FIG. 2, only a part of the second touch sensing electrodes TSE21~TSE26 are marked. Different from the touch screen 110 in FIG. 1, the touch screen 200 is divided into a center area and an edge area by a rectangle boundary RB. The center area is formed within the rectangle boundary RB, and the edge area is formed external from the rectangle boundary RB. The edge area may be evenly divided into a plurality of divided zones according to center angles (such as the center angles CA1~CA6), and the second touch sensing electrodes TSE21~TSE26 can be respectively disposed into the evenly divided zones. In this embodiment, the center angles CA1~CA6 substantially equal.

On the other hand, the center area may be a rectangle and divided into plurality of divided zones in an array form. The first touch sensing electrodes TSE1 are respectively disposed in the divided zones.

In this embodiment, take the second touch sensing electrode TSE22 as an example, the second touch sensing electrode TSE22 has an inner side IAS and an outer side OAS. The inner side IAS of the second touch sensing electrode TSE22 is positioned along a boundary BD of the adjacent first touch sensing electrodes TSE1. The outer arc side OAS of the second touch sensing electrode TSE22 is corresponding to the central angle CA2.

It should be noted here, there is a gap (such as a gap GP) disposed two adjacent first touch sensing electrodes, two adjacent second touch sensing electrodes and adjacent first touch sensing electrode and second touch sensing electrode. Two touch sensing electrodes are not directly connected here.

Figure 3:
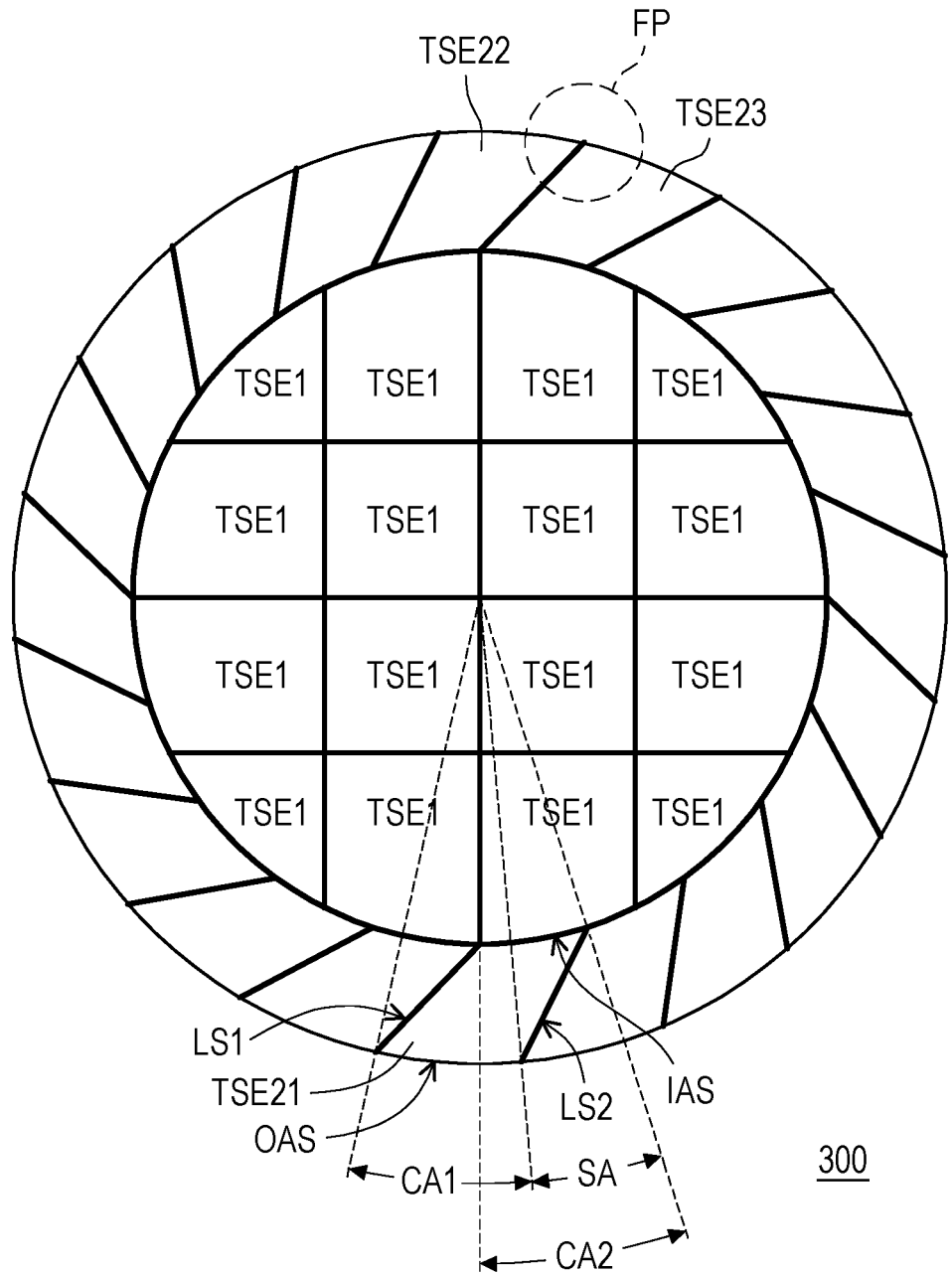
FIG. 3 illustrates a schematic diagram of a touch screen according to another embodiment of present disclosure.

Please refer to FIG. 3, which illustrates a schematic diagram of a touch screen according to another embodiment of present disclosure. The touch screen 300 includes a plurality of first touch sensing electrodes TSE1 and a plurality of second touch sensing electrodes TSE21 to TSE23. The first touch sensing electrodes TSE1 are disposed in a center area of the touch screen 300 and surrounded by the second sensing electrodes which are disposed in an edge area. Different from the touch screens 110 and 200, take the second touch sensing electrode TSE21 as an example, the second touch sensing electrode TSE21 is disposed by an angle of inclination.

In detail of the second touch sensing electrode TSE21, the second touch sensing electrode TSE21 has an inner arc side IAS and an outer arc side OAS. The inner arc side IAS of the second touch sensing electrode TSE21 corresponds to a central angle CA2. The outer arc side OAS of the second touch sensing electrode TSE21 corresponds to a central angle CA1. In here, there is an angular shift SA between the central angle CA2 and the center angle CA1, and the angular shift SA is a predetermined angle exist between the central angle CA2 and the center angle CA1. That is, the central angle CA1 is equivalent to the central angle CA2 being rotated by the predetermined angle.

On the other hand, the second touch sensing electrode TSE21 also has two lateral sides LS1 and LS2. The lateral side LS1 is disposed opposite to the lateral side LS2, and each of the lateral sides LS1 and LS2 is disposed between the inner arc side IAS and the outer arc side OAS. In this embodiment, extending lines along the two lateral sides LS1 and LS2 can form an interior angle.

In this embodiment, by disposing the second touch sensing electrode with an angle of inclination, number of touch sensing electrodes of a touched area FP can be increased. In this case, the second sensing electrodes TSE22 and TSE23 are triggered by the touched area FP. Such as that, the second sensing electrodes TSE22 and TSE23 can respectively response two touch sensing signals, and the two touch sensing signals respectively represent touching areas of two parts of the touched area FP. That is, effective touch sensing data can be generated by the two touch sensing signals.

Figure 4:
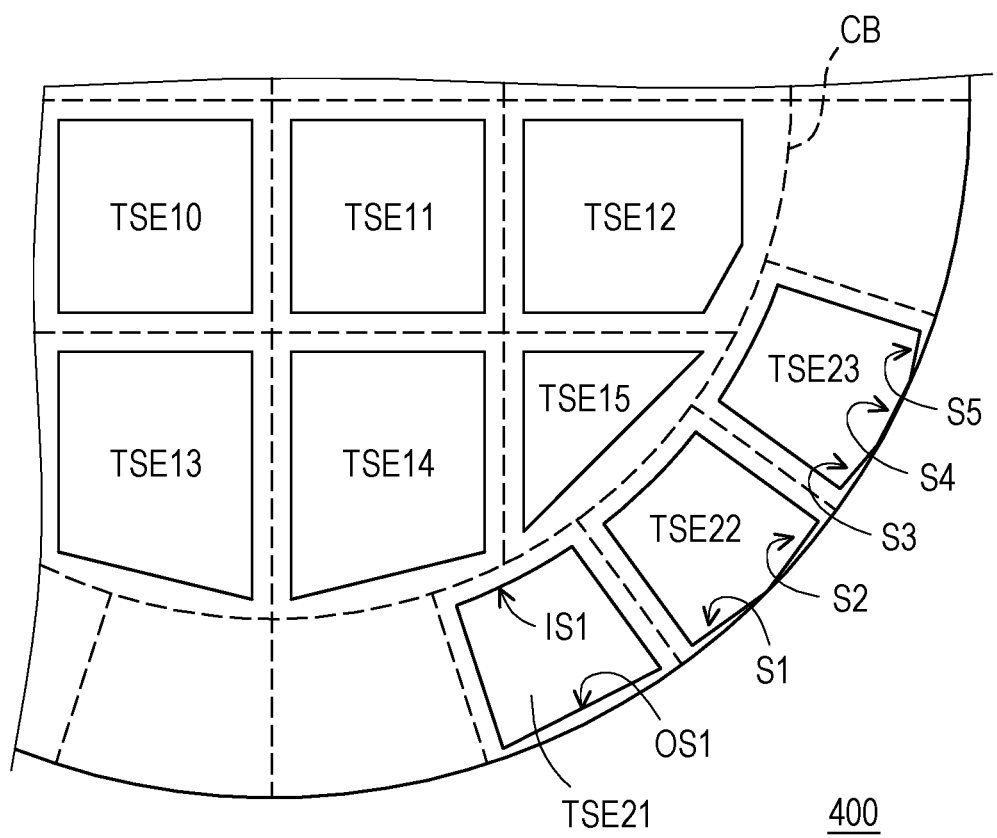
FIG. 4 illustrates a schematic diagram of a part of a touch screen according to another embodiment of present disclosure.

Please refer to FIG. 4, which illustrates a schematic diagram of a part of a touch screen according to another embodiment of present disclosure. The touch screen 400 includes a plurality of first touch sensing electrodes TSE10~TSE15 and a plurality of second touch sensing electrodes TSE21~TSE23. The first touch sensing electrodes TSE10~TSE15 are disposed in a center area of the touch screen 400, and the second touch sensing electrodes TSE21~TSE23 are disposed in an edge area of the touch screen 400. The center area and the edge area can be divided according to a ring boundary CB.

In this embodiment, each of the first touch sensing electrodes TSE10~TSE15 may has any shape. For example, the first touch sensing electrodes TSE10 and TSE11 are rectangles, and the first touch sensing electrodes TSE12 to TSE15 are all trapezoids.

Take the second touch sensing electrode TSE21 as an example. The second touch sensing electrode TSE21 has an outer side OS1 and an inner side IS1. The inner side IS1 is adjacent to the first touch sensing electrodes TSE14 and TSE15, and the outer side OS1 is disposed opposite to the inner side IS1. In this embodiment, the outer side OS1 may be a straight line rather than an arc, and the inner side IS1 may be an arc or a straight line. Take the second touch sensing electrodes TSE22 and TSE23 as another example. The outer side of the second touch sensing electrodes TSE22 can be formed by two straight sides S1 and S2 to form a polygon. The outer side of the second touch sensing electrodes TSE23 can be formed by three straight sides S3, S4 and S5 to form another polygon. That is, shape of outer side of each second touch sensing electrode of present disclosure may be arc or polygon, and no special limitation here.

Figure 5:
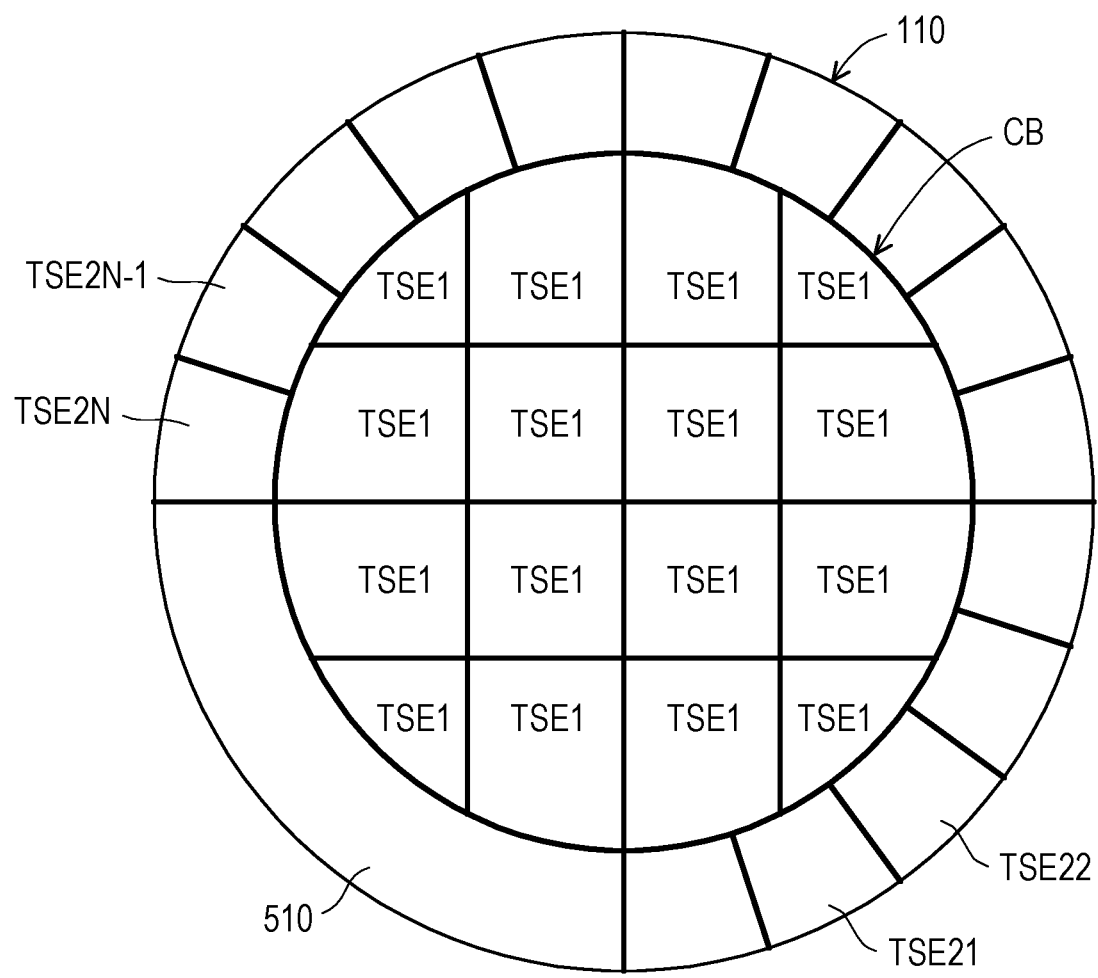
FIG. 5 illustrates a schematic diagram of a touch screen according to another embodiment of present disclosure.

Please refer to FIG. 5, which illustrates a schematic diagram of a touch screen according to another embodiment of present disclosure. The touch screen 500 includes a plurality of first touch sensing electrodes TSE1 and a plurality of second touch sensing electrodes TSE21 to TSE2N. In this embodiment, the touch screen 500 may be divided into a center area and an edge area by a ring boundary CB. The first touch sensing electrodes TSE1 are disposed in the center area within the ring boundary CB, and the second touch sensing electrodes TSE21 to TSE2N are disposed in the edge area out of the ring boundary CB.

It should be noted here, in this embodiment, an empty area 510 can be set on the edge area of the touch screen 500. There is no touch sensing electrode disposed in the empty area 510. In one touch screen 500, one or more empty area 510 can be set by a designer of the touch screen 500. A position of the empty area 510 can be determined by the designer according to a necessary of a product, and no more special limitation here.

Please refer to FIG. 6A to FIG. 6C, which illustrate a schematic plot of a cross section of a touch display screen integrated by a touch screen and a display screen according to embodiments of present disclosure. The display screen can be integrated with a liquid crystal display screen to form the touch display screen. The touch screen may be form as an in-cell touch sensing structure. In FIG. 6A, the touch display screen may include a cover glass CG, a sensing layer SENL, an optical clear adhesive layer OCA, a polarizer POL and a liquid crystal layer LCD. The sensing layer SENL may be implemented by any one of the display screens 110, 200, 300, 400 and 500. In this embodiment, the cover glass CG, the sensing layer SENL, the optical clear adhesive layer OCA, the polarizer POL and the liquid crystal layer LCD are overlapped with each other, the sensing layer SENL may be disposed between the cover glass CG and the optical clear adhesive layer OCA.

In FIG. 6B, the touch display screen may have a cover glass CG, an optical clear adhesive layer OCA, a polarizer POL, a sensing layer SENL and a liquid crystal layer LCD. The cover glass CG, the optical clear adhesive layer OCA, the polarizer POL, the sensing layer SENL and the liquid crystal layer LCD are overlapped with each other. Different from FIG. 6A, the sensing layer SENL is disposed between the polarizer POL and the liquid crystal layer LCD.

In FIG. 6C, the touch display screen may have a cover glass CG, an optical clear adhesive layer OCA, a polarizer POL, a color filter glass CFG, a sensing layer SENL and a thin film transistor glass TFTG. The cover glass CG, the optical clear adhesive layer OCA, a polarizer POL, the color filter glass CFG, the sensing layer SENL and the thin film transistor glass TFTG are overlapped with each other. The sensing layer SENL is disposed between the color filter glass CFG and the thin film transistor glass TFTG.

Please refer to FIG. 7A to FIG. 7C, which illustrate cross section of a touch display screen integrated by a touch screen and a display screen according to other embodiments of present disclosure. The display screen can be integrated with an organic light emitting diode display screen to form the touch display screen. The touch screen may be form as an in-cell touch sensing structure. In FIG. 7A, the touch display screen includes a cover glass CG, a sensing layer SENL, an optical clear adhesive layer OCA, a polarizer POL and an organic light emitting diode layer OLED. The cover glass CG, the sensing layer SENL, the optical clear adhesive layer OCA, the polarizer POL and the organic light emitting diode layer OLED are overlapped with each other. In this embodiment, the sensing layer SENL is disposed between the cover glass CG and the optical clear adhesive layer OCA.

In FIG. 7B, the touch display screen includes a cover glass CG, an optical clear adhesive layer OCA, a polarizer POL, a sensing layer SENL and an organic light emitting diode layer OLED which are overlapped disposed with each other. Different from FIG. 7A, the sensing layer SENL may be disposed between the polarizer POL and the organic light emitting diode layer OLED.

In FIG. 7C, the touch display screen includes a cover glass CG, an optical clear adhesive layer OCA, a polarizer POL, an organic light emitting diode layer OLED and a sensing layer SENL which are overlapped disposed with each other. Different from FIG. 7A and FIG. 7B, the sensing layer SENL may be disposed below the organic light emitting diode layer OLED.

In summary, the present disclosure provides a touch apparatus including a touch screen and a touch controller. The touch screen includes a plurality of first touch sensing electrodes which are disposed in a center area of the touch screen, and a plurality of the second touch sensing electrodes which are disposed in an edge area of the touch screen. By setting the second touch sensing electrodes have same central angles, a uniformity of the second touch sensing electrodes can be increased, and a touch sensing accuracy of the touch apparatus can be increased correspondingly.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A touch apparatus comprising:
a touch screen and a touch controller configured to process touch sensing signals received from the touch screen to generate a touch coordinate with respect to a touch event occurring on the touch screen, wherein the touch screen comprises:
a plurality of first touch sensing electrodes, disposed in a center area of the touch screen, wherein at least one of the first touch sensing electrodes is an exact rectangle; and
a plurality of second touch sensing electrodes disposed in an edge area of the touch screen surrounding the center area, wherein each of the second touch sensing electrodes is corresponding to each of a plurality of central angles and the central angles corresponding to the plurality of second touch sensing electrodes are substantially equal
wherein the each of the second touch sensing electrodes comprises an outer arc side corresponding to the central angle, and the each of the second touch sensing electrodes further comprises an inner arc side corresponding to a second central angle as large as the central angle, and an angular shift, which is a predetermined angle, exists between the second central angle and the central angle such that the central angle is equivalent to the second central angle being rotated by the predetermined angle.

2. The touch apparatus as claimed in claim 1, wherein the touch controller calculates a touch coordinate based on a perpendicular coordinate system in response to that the touch controller determines the most effective touch sensing data is generated based on a touch sensing signal from one of the plurality of first touch sensing electrodes.

3. The touch apparatus as claimed in claim 1, wherein the touch controller calculates a touch coordinate based on a polar coordinate system in response to the touch controller determines the most effective touch sensing data is generated based on a touch sensing signal from one of the plurality of second touch sensing electrodes.

* * * * *